June 23, 1970  F. E. BUSCHBOM  3,517,369
THREE PHASE TRANSITION ASSEMBLY
Filed Nov. 15, 1967  2 Sheets-Sheet 1
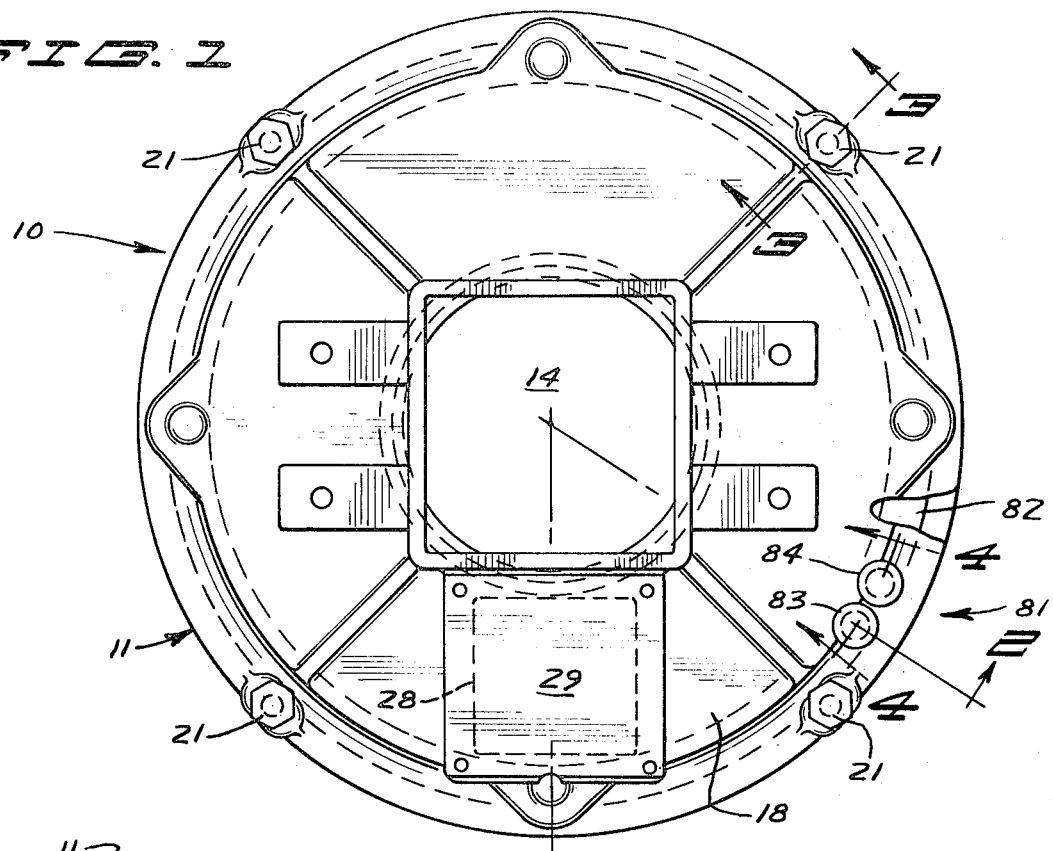
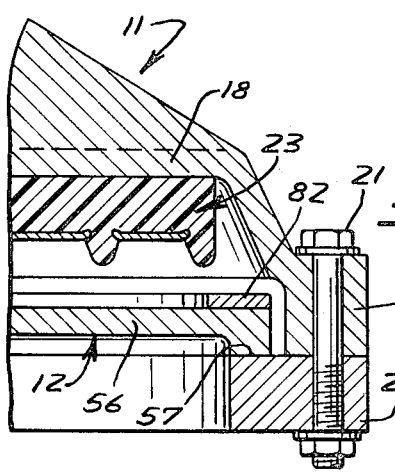
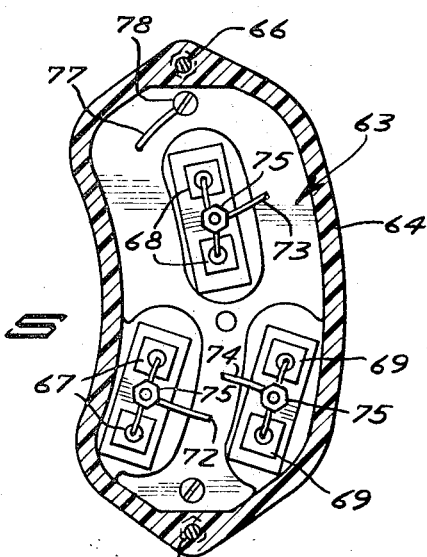
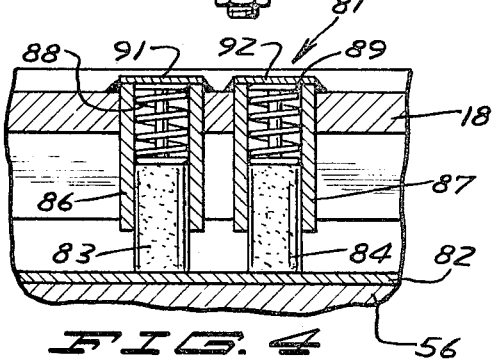
INVENTOR.
FLOYD E. BUSCHBOM
BY
Burd, MacEachron, Braddock,
Bartz & Schwartz
ATTORNEYS June 23, 1970  F. E. BUSCHBOM  3,517,369
THREE PHASE TRANSITION ASSEMBLY
Filed Nov. 15, 1967  2 Sheets-Sheet 2
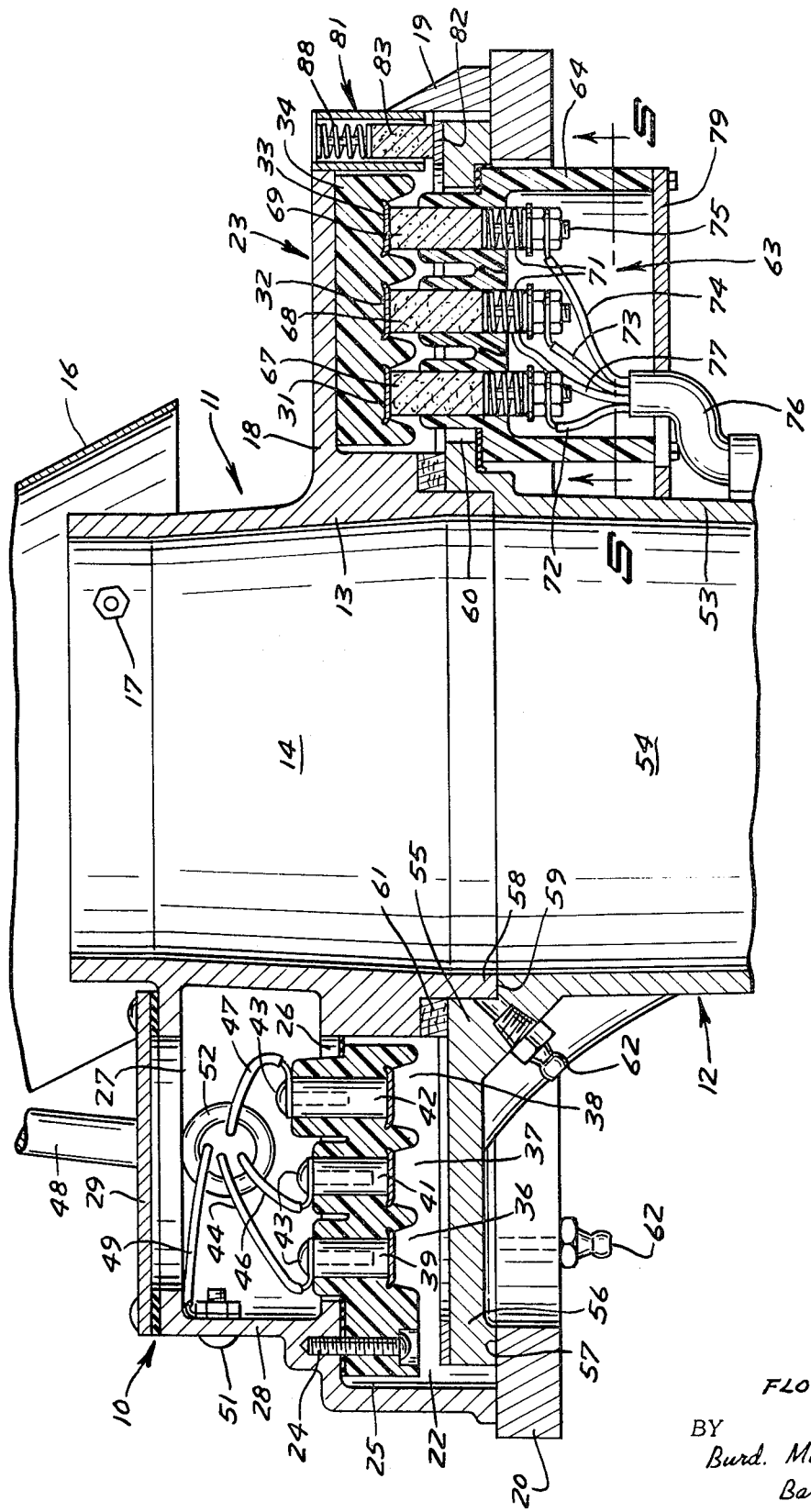
INVENTOR.
FLOYD E. BUSCHBOM
BY
Burd, MacEachron, Braddock,
Bartz & Schwartz
ATTORNEYS

United States Patent Office 3,517,369
Patented June 23, 1970

3,517,369
THREE PHASE TRANSITION ASSEMBLY
Floyd E. Buschbom, Long Lake, Minn., assignor to Van Dale Corporation, Long Lake, Minn., a corporation of Minnesota
Filed Nov. 15, 1967, Ser. No. 683,356
Int. Cl. H01r 39/02, 3/06
U.S. Cl. 339—5                                      6 Claims

ABSTRACT OF THE DISCLOSURE

A silo unloader electrical contact ring assembly having a stationary cylindrical housing member formed with an outwardly directed flange carrying a ring of electrically insulative material. Three concentric spaced conductor rings imbedded in the insulative material are connected to a source of electric power. A rotatable cylindrical housing member mounted on the stationary housing member has an annular flange carrying a brush assembly having three pairs of electrical contacts engageable with the conductor rings. A separate conductor ring mounted on the rotatable housing member coacts with a pair of brushes mounted in the stationary housing member to electrically couple the housing members so that the housing members form a ground connection enabling the assembly to be safely used with three phase electric power.

BACKGROUND OF INVENTION

Silo unloaders as shown, for example, in the U.S. Pats. No. 2,794,560 and No. 2,801,137, have electrical contact ring assemblies for transmitting electric power through the stationary portion to the rotable portion of the unloader. The electric power is delivered to a motor normally mounted on the rotatable portion of the unloader. These contact ring assemblies are not constructed and designed so that they are readily disassembled for cleaning and inspection. In addition, they are susceptible to condensation and do not effectively prevent the entrance of foreign matter. A effort has been made to overcome these objections by providing a seal in the collector ring assembly and providing contact brushes which may be readily removed for cleaning. An example of this contact ring assembly is shown in the U.S. Pat. No. 3,181,715. All of these contact ring assemblies have been designed for single phase power with brushes engaging two or three concentric electric conductor rings.

Present cattle feeding operations are designed for extensive use of electric power to reduce manpower and time. Much of this electric power is three phase power to provide for the maximum efficiency of electricity. Three phased electric motors used to operate a silo unloader require three power lines and a ground line. The prior art electric contact ring assemblies for silo unloaders do not have the fourth contact ring assembly or a ground line. The contact ring assembly of the present invention has provided a silo unloader contact ring assembly with a separate ground connection for a three phase motor.

SUMMARY OF INVENTION

The invention relates to an electrical ring contact assembly or transition assembly having three concentrically spaced electrical conductor rings carried by insulating material mounted in a housing. Cooperating with the rings are electrical conducting brushes used to transmit power through the rotatable portion of the assembly. A ground brush unit and ring is used in conjunction with the stationary housing and rotatable housing to provide a ground connection for a three phase electric motor.

In the drawings:
FIG. 1 is a plan view of the three phase transition assembly of the invention;
FIG. 2 is an enlarged sectional view taken along the line 2—2 of FIG. 1;
FIG. 3 is an enlarged sectional view taken along the line 3—3 of FIG. 1;
FIG. 4 is an enlarged sectional view taken along the line 4—4 of FIG. 1; and
FIG. 5 is a sectional view taken along the line 5—5 of FIG. 2.

Referring to the drawings there is shown in FIGS. 1 and 2, the three phase electrical contact assembly or transition assembly of this invention indicated generally at 10. This assembly is usable with a silo unloader, as the silo unloader in U.S. Pat. No. 2,794,560, equipped with a three phase motor. Three phase transition assembly 10 has a stationary sub-assembly 11 rotatably carrying a sub-assembly 12 attached to the movable portion of the silo unloader for receiving silage from the discharge mechanism of the silo unloader. The stationary sub-assembly 11 is anchored to the silo wall by a torque arm (not shown).

Sub-assembly 11 comprises an upright tubular member 13 having an upright venturi passage 14 for directing the material into an arcuate chute 16 projected upwardly and outwardly toward the door opening in the silo wall. Chute 16 is pivotally mounted on the top of tubular member 13 by a pair of nut and bolt assemblies 17 one of which is shown in FIG. 2.

Integral with the mid-portion of the outside of tubular member 13 is an annular horizontal and outwardly directed radial flange 18 having a downwardly projected peripheral side wall 19. An annular or member ring 20 is secured to peripheral side wall 19 by a plurality of nut and bolt assemblies 21 shown in FIGS. 1 and 3.

Radial flange 18 and side wall 19 define an annular chamber 22 accommodating a slip ring unit indicated generally at 23. A plurality of bolts 24 projected through suitable holes in circumferentially spaced ears 25 and threaded into bores in the flange 18 secure the slip ring unit 23 to the flange 18. When the slip ring unit 23 is mounted on flange 18 a portion of the unit projects through an opening 26 into a junction box chamber 27 defined by generally rectangular upright wall 28 having an open top. Chamber 27 is closed with a flat closure 29 secured to the top of wall 28.

Slip ring unit 23 has three concentric spaced metal annular conductors or slip rings 31, 32 and 33. Each of the conductors is a flat annular metal member made from conductive metal, as copper, copper alloys and the like. The slip rings 31, 32 and 33 are identical except for the difference in diameters of the rings. Each of the rings is mounted in concentric relationship with the other rings in an annular base or support 34 of non-electrical conductive material, as hard synthetic resinous material. Support 34 has three annular and concentric recesses or channels 36, 37 and 38 with the slip rings 31, 32 and 33 imbedded in the material and extended across the base of the channels. Mounted in spaced upright openings in the base 34 are upright members 39, 41 and 42 which contact the rings 31, 32 and 33 respectively. Bolts 43 threaded into the upper ends of members 39, 41 and 42 connect lines 44, 46 and 47 to the members respectively. These lines are part of an electric cord 48 which includes a ground wire 49 leading from a source of electric power. A nut and bolt assembly 51 projected through a suitable hole in the upright wall 48 connects ground line 49 to the stationary housing 13 of sub-assembly 11. Wall 28 has a hole carrying a grommet or flexible sleeve 52 providing an entrance opening into the chamber 27 for cord 48.

Rotatable sub-assembly 12 comprises an upright tubular member 53 having an upright passage 54 aligned with the venturi passage 14. The member 53 is adapted to be secured to the discharge structure of the silo unloader impeller housing to receive material from the moving impeller and direct the material upwardly through the passages 54 and 14 into the discharge chute 16 for movement through the door in the silo wall. As shown in FIG. 2, rotatable sub-assembly 12 has an outwardly directed horizontal annular flange 55 integral with the top of member 53. The outer peripheral portion 56 of flange 55 has a bottom annular horizontal peripheral surface 57 riding on the upper surface of ring 20.

Tubular member 13 has a downwardly projected annular lip 58 extended into an annular recess 59 in the top of member 53. Surrounding lip 58 is an annular seal 61 which cooperates with the lip to prevent material in the passage 14 from entering the chamber 23. Grease fittings 62 are used to supply lubricant to the engaging surfaces of the flange 56 and ring 20 and the engaging surfaces between the member 53 and the lip 58. The lubricant, as grease, being electrically non-conductive insulates the stationary sub-assembly 11 from the rotation sub-assembly 12 so that an effective and reliable electrical connection is not achieved through the engaging surfaces of the members 13 and 53.

Flange 55 has an opening 60 inwardly of ring 20 for accommodating a brush unit indicated generally at 63. Brush unit 63 has a retainer or support 64 of insulative material secured to the flange 55 by bolts 66, shown in FIG. 5. Retainer 64 has spaced upright bores for slidably accommodating three pairs of upright brushes 67, 68 and 69. Each of the six brushes has flat upper ends in engagement with a slip ring. The springs 71 acting on the opposite ends of the brushes bias the brushes into engagement with the associated slip rings. As shown in FIG. 5, each slip ring is engaged with a pair of brushes. The pairs of brushes 67, 68 and 69 are connected to lines 72, 73 and 74 respectively retained there by nuts 75. Lines 72, 73 and 74 lead from a cord 76 (FIG. 2) containing a ground wire 77 for the three phase electric motor of a silo unloader. A bolt 78 connects the ground line 77 to the flange 55. The brushes are enclosed in the retainer 64 by a cover plate 79 attached to the open end of the retainer 64.

With the ground line 49 connected to a housing side wall 28 of the stationary housing and the ground line 77 connected to the rotatable flange 55 both housings of the sub-assemblies are used as part of the ground line conductor. To insure positive and continuous electrical connection between the stationary and rotatable housings there is provided a slip ring and brush contact or contact ring assembly indicated generally at 81, shown in FIGS. 1, 2 and 4.

Assembly 81 comprises an annular ring 82 secured to the top of the outer peripheral portion 56 of the rotatable flange 55. A pair of upright brushes 83 and 84 slidably engage the top surface of the ring 82 providing an electrical connection between the brushes and the ring. The brushes 83 and 84 are slidably retained in upright sleeves 86 and 87 projected through suitable holes in the stationary flange 18. The sleeves 86 and 87 secured to flange 18 project toward ring 82 terminating a short distance from the ring to provide supports for the brushes 83 and 84. Located within the sleeves 86 and 87 are a pair of coil springs 88 and 89 which bias the brushes 83 and 84 into engagement with the ring 82. Removable caps 91 and 92 are used to close the top ends of the sleeves 86 and 87 respectively. The contact ring assembly 81 provides a continuous and positive electrical connection between the stationary and rotatable housing of the transition assembly 10. The fourth slip ring 82 and brushes 83 and 84 along with both the rotatable and stationary housings 53 and 13 form a ground line conduit which completes the circuit to ground lines 49 and 77.

In use, the brush assembly 63 cooperates with the rings 31, 32 and 33 to provide an electrical connection for the power lines of a three phase electric motor of a silo unloader. A separate contact ring assembly 81 in conjunction with the housings 53 and 13 of the assembly 10 serves as a ground electric link between the ground wires for the motor. Assembly 81 has eliminated the necessity of enlarging the brush unit 63 and the cooperating slip ring unit 23 to provide a transition assembly for three phase power. The ring 82 and brushes 83 and 84 being located in the chamber 22 are enclosed so that their effectiveness is not reduced by condensation or foreign materials. Also all brushes operate in pairs to ensure continuous electrical connections between the stationary and rotatable housings.

It is apparent that many modifications and variations of the three phase transition assembly shown and described may be made without departing from the spirit and the scope of the invention.

The embodiments of the invention in which an exclusive property or privilege is claimed are defined as follows:

1. A silo unloader electrical transition assembly comprising: a stationary housing having an upright tubular member with a first upright passage, a movable housing mounted for rotation on the stationary housing, said movable housing having an upright tubular member with a second passage aligned with the first passage, a slip ring unit mounted on one of said housings, said unit having first electrical contact rings surrounding the tubular member of said one housing, a first brush unit mounted on the other housing, said first brush unit having at least one brush engageable with each contact ring, and an electrical coupling means electrically connecting the stationary housing with the movable housing whereby both housings provide an electrical ground link around the slip ring unit and brush unit, said coupling means including a second electrical contact ring mounted on one of said housings and surrounding the tubular member thereof.

2. The transition assembly of claim 1 wherein said stationary housing has an outwardly directed first annular flange, means mounting the first slip ring unit on the first flange, and wherein said movable housing has an outwardly directed second annular flange, ring means secured to one of the flanges cooperating with the other flange to rotatably connect the movable member with the stationary member, said electrical coupling means electrically connecting said flanges.

3. The transition assembly of claim 2 wherein said first slip ring unit has three contact rings connected to a three phase power source, said electrical coupling means and housings providing a ground link around the slip ring unit and brush unit.

4. The transition assembly of claim 2 wherein: said second brush unit has a plurality of brushes and sleeves carrying the brushes secured to the first flange of the stationary housing, said plurality of brushes being engageable with said second ring.

5. A silo unloader electrical transition assembly comprising: a stationary housing having an upright tubular member with a first upright passage, said tubular member having an outwardly directed first annular flange, a movable housing mounted for rotation on the stationary housing, said movable housing having an upright tubular member with a second passage aligned with the first passage and an outwardly directed second annular flange, located adjacent the first annular flange, slidably supported on the stationary housing, a slip ring unit mounted on the first flange, said unit having first electrical contact rings, a brush unit mounted on the second flange, said brush unit having at least one brush engageable with each contact ring, and an electrical coupling means electrically connecting the stationary housing with the movable housing whereby both housings provide an electrical ground link around the slip ring unit and brush unit, said electrical coupling means comprising a second electrical conductor ring secured to the first annular flange of the movable housing and second brushes supported on the second annular flange of the stationary housing, said second brushes being engageable with the second ring.

6. The transition assembly of claim 5 wherein: said first slip ring unit has three contact rings connected to a three phase power source, said electrical coupling means and housings providing a ground link around the first slip ring unit and first brush unit.

References Cited

UNITED STATES PATENTS

| | | | |
|---|---|---|---|
| 2,309,316 | 1/1943 | Hollander | 339—5 |
| 2,490,329 | 12/1949 | Wilde | 170—160.23 |
| 2,774,831 | 12/1956 | Lafferty et al. | 339—5 X |
| 3,314,038 | 4/1967 | Rutten | 339—5 |

RICHARD E. MOORE, Primary Examiner

U.S. Cl. X.R.

339—14